(12) United States Patent
Chapman et al.

(10) Patent No.: US 7,464,973 B1
(45) Date of Patent: Dec. 16, 2008

(54) APPARATUS FOR TRACTION CONTROL HAVING DIAMOND AND CARBIDE ENHANCED TRACTION SURFACES AND METHOD OF MAKING THE SAME

(75) Inventors: Mark Chapman, Midvale, UT (US); Giovani Gongora, Spanish Fork, UT (US); Roger Vale, Sandy, UT (US)

(73) Assignee: U.S. Synthetic Corporation, Orem, UT (US)

( * ) Notice: Subject to any disclaimer, the term of this patent is extended or adjusted under 35 U.S.C. 154(b) by 555 days.

(21) Appl. No.: 10/358,753

(22) Filed: Feb. 4, 2003

(51) Int. Cl.
*B25J 15/00* (2006.01)
*B66C 1/44* (2006.01)
(52) U.S. Cl. .................. 294/1.1; 294/902; 269/273
(58) Field of Classification Search .............. 294/1.1, 294/902; 269/259, 271, 273, 274, 279, 280
See application file for complete search history.

(56) References Cited

U.S. PATENT DOCUMENTS

| | | | | |
|---|---|---|---|---|
| 3,090,614 A | * | 5/1963 | Freeman et al. ........... 269/273 |
| 3,655,233 A | * | 4/1972 | Twist ..................... 294/118 |
| 3,894,673 A | * | 7/1975 | Lowder et al. ........... 288/124.5 |
| 4,592,682 A | * | 6/1986 | Vanistendael ........... 408/241 R |
| 4,629,373 A | * | 12/1986 | Hall ......................... 407/118 |
| 4,893,859 A | * | 1/1990 | Nash ....................... 294/103.1 |
| 5,011,515 A | * | 4/1991 | Frushour .................... 51/307 |
| 5,054,246 A | | 10/1991 | Phaal et al. |
| 5,172,778 A | | 12/1992 | Tibbitts et al. |
| 5,662,720 A | * | 9/1997 | O'Tighearnaigh ............ 51/295 |
| 5,669,271 A | * | 9/1997 | Griffin et al. ............... 76/108.2 |
| 6,065,554 A | | 5/2000 | Taylor et al. |
| 6,110,030 A | | 8/2000 | Hashimoto |
| 6,302,410 B1 | * | 10/2001 | Wentworth et al. ......... 279/152 |

* cited by examiner

*Primary Examiner*—Dean J Kramer
(74) *Attorney, Agent, or Firm*—Holland & Hart (57) ABSTRACT

A traction control device and the method of making the same wherein the device has contact surfaces, typically formed from polycrystalline diamond compacts inserted into a base, and where the inserts, and in some embodiments the base, are machined or cut to induce profiles for enhanced gripping and improved wear characteristics.

18 Claims, 9 Drawing Sheets

APPARATUS FOR TRACTION CONTROL HAVING DIAMOND AND CARBIDE ENHANCED TRACTION SURFACES AND METHOD OF MAKING THE SAME

BACKGROUND OF INVENTION

1. Field of the Invention

This invention relates to traction, anchoring and securing devices used for gripping surfaces. More specifically, this invention relates to traction and anchoring devices that have diamond traction surfaces and the methods of making such devices.

2. Description of Related Art

A variety of gripping devices are well known in the art. Generally, these devices make use of rubber, steel and other similar materials, and do not make use of diamond/carbide inserts, as traction surfaces and therefore do not have the heat and wear resistance provided by diamond/carbide traction surfaces.

Although, these referenced documents may not necessarily constitute prior art, the reader is referred to the following U.S. patent documents for general background material. Each of these patents is hereby incorporated by reference in its entirety for the material contained therein.

U.S. Pat. No. 3,981,308 describes a positive-locking surgical clamp.

U.S. Pat. No. 4,304,971 describes a telephone locking device.

U.S. Pat. No. 4,327,703 describes a method of preparing the upper end of a concrete column containing elongated reinforcing elements.

U.S. Pat. No. 4,413,763 describes a method of breaking an optical fiber.

U.S. Pat. No. 4,545,723 describes an apparatus for adapting a general purpose and effector device to a special purpose end effector that includes an adaptor bracket assembly.

U.S. Pat. No. 4,643,262 describes a pressurized medium actuated gripping device which is included in a rock or earth drilling machine.

U.S. Pat. No. 4,753,456 describes an elongate metal crossmember that is connect to an extends transversely across a vehicle frame.

U.S. Pat. No. 4,879,926 describes a programmable wire stripper provided for cutting and stripping selectively variable length insulation portions from the end of wire segments presented at a workstation.

U.S. Pat. No. 5,005,450 describes a locking tool that comprises three or more pieces.

U.S. Pat. No. 5,074,176 describes a rotatable chuck for supporting a plastic coated workpiece in a power driven threading machine.

U.S. Pat. No. 5,141,378 describes a mobile intervention chamber for providing access to an installation placed in an active cell.

U.S. Pat. Nos. 5,449,262 and 5,634,760 describe inserter/extractor apparatus for inserting and extracting objects from bins located at different heights in a carousel.

U.S. Pat. No. 5,615,588 describes an apparatus for processing edges of ophthalmic lenses with a gripping device for the ophthalmic lens.

U.S. Pat. No. 5,735,862 describes a semi-automatic suturing device that passes a single or double pointed needle back and forth between two needle holders.

U.S. Pat. No. 5,941,513 describes a mounting bracket for a workpiece holder that includes a pair of plates which can be coupled together so as to define two openings at their coupled surfaces.

U.S. Pat. No. 6,009,583 describes a pliers-knife combination that includes pivotally connected elongated members.

U.S. Pat. Nos. 6,048,013, US 6,176,533 B1 and US 6,227,586 B1 describe modular gripper assemblies having a body with a yoke structure.

U.S. Pat. No. 6,082,224 describes a power tong for rotating tubular members for make-up and break-out operations.

U.S. Pat. No. 6,199,728 B1 describes a clamp-type garment hanger defined by a pair of opposed jaw members between which a garment is hung.

U.S. Pat. No. 6,221,083 B1 describes a suture needle holder.

U.S. Pat. Nos. 6,256,841 B1 and US 6,357,085 B2 describe a tension member termination device optimized for terminating flat tension members having compressible outer coatings.

U.S. Pat. No. 6,273,408 B1 describes a mounting bracket for a workpiece holder that includes a pair of plates which can be coupled together so as to define two openings at their coupled surfaces.

U.S. Pat. No. 6,302,410 B1 describes a jaw for a rod gripping device that includes a front, rod engaging face and a plurality or teeth or studs made of a material harder than the jaw body, such as tungsten carbide.

U.S. Pat. No. 6,425,616 B2 describes a parts gripper assembly.

U.S. Pat. No. 6,447,291 B2 describes an orthodontic jig for attaching orthodontic brackets on the teeth.

SUMMARY OF INVENTION

It is desirable to provide a traction control device for making such a traction control device that is specifically designed for use on hard surfaces where heat, weight, friction, corrosion, abrasion and other challenging conditions make diamond and carbide more effective and longer lasting. It is particularly desirable to provide a method for making such traction control devices.

Accordingly, it is an object of this invention to provide a traction control device having one or more diamond/carbide studs for the traction contact surface.

Another object of this invention is to provide a traction control device where the diamond/carbide studs are mounted into a fixture.

A further object of this invention is to provide a traction control device where the traction contact surfaces are provided at one or more angles to the surface being anchored or gripped.

A still further object of this invention is to provide a traction control device where the angles of the traction control surfaces are optimized for the material being anchored to or gripped.

It is another object of this invention to provide a traction control device which in some embodiments have traction ridges.

It is a further object of some embodiments of this invention to provide a traction control device having serrated facets.

It is a further object of some embodiments of this invention to provide a traction control device having sharpened points.

It is a further object of some embodiments of this invention to provide a traction control device having a textured surface.

It is a still further object of some embodiments of this invention to provide a traction control device appropriate for use in down-hole drilling.

It is an object of some embodiments of this invention to provide a traction control device appropriate for use with remote vehicles and robotic applications.

It is a still further object of some embodiments of this invention to provide a method of manufacturing traction control devices having diamond/carbide traction surfaces.

Additional objects, advantages and other novel features of this invention will be set forth in part in the description that follows and in part will become apparent to those skilled in the art upon examination of the following or may be learned with the practice of the invention. The objects and advantages of this invention will become readily apparent to those skilled in the art from the following description wherein there is shown and described several present preferred embodiments of the invention, simply by way of illustration of one of the modes best suited to carry out this invention. As it will be realized, this invention is capable of other embodiments, in its several details and several specific geometries and method steps and are capable of modification in various aspects without departing from the concept of this invention. Accordingly, these objects, the drawings and descriptions should be regarded as illustrative in nature and not as restrictive.

BRIEF DESCRIPTION OF DRAWINGS

The accompanying drawings incorporated in and forming a part of the specification, illustrate present preferred embodiments of the invention. Some, although not all, alternative embodiments are described in the following drawings and description.

In the drawings.

DETAILED DESCRIPTION

This invention is traction or anchoring device enhanced by diamond/carbide inserts providing the traction surface and the method for making such traction or anchoring devices. Generally, diamond/carbide traction surfaced traction devices are used on hard surfaces where heat, weight, friction, corrosion, abrasion and other strain and stress conditions make the use of diamond/carbide inserts more effective and longer lasting compared to other traction surface materials or devices. Therefore, the traction devices of this invention have a wide variety of applications, including but not necessarily limited to, down-hole traction control for gripping the sides of the hole and moving an extraction device down the hole where they can attach to a bit or other broken part and for pulling the part out of the hole; gripping jaws for lifting steel pipe and the like; and robot or remote controlled vehicle gripping devices.

Figure 1:
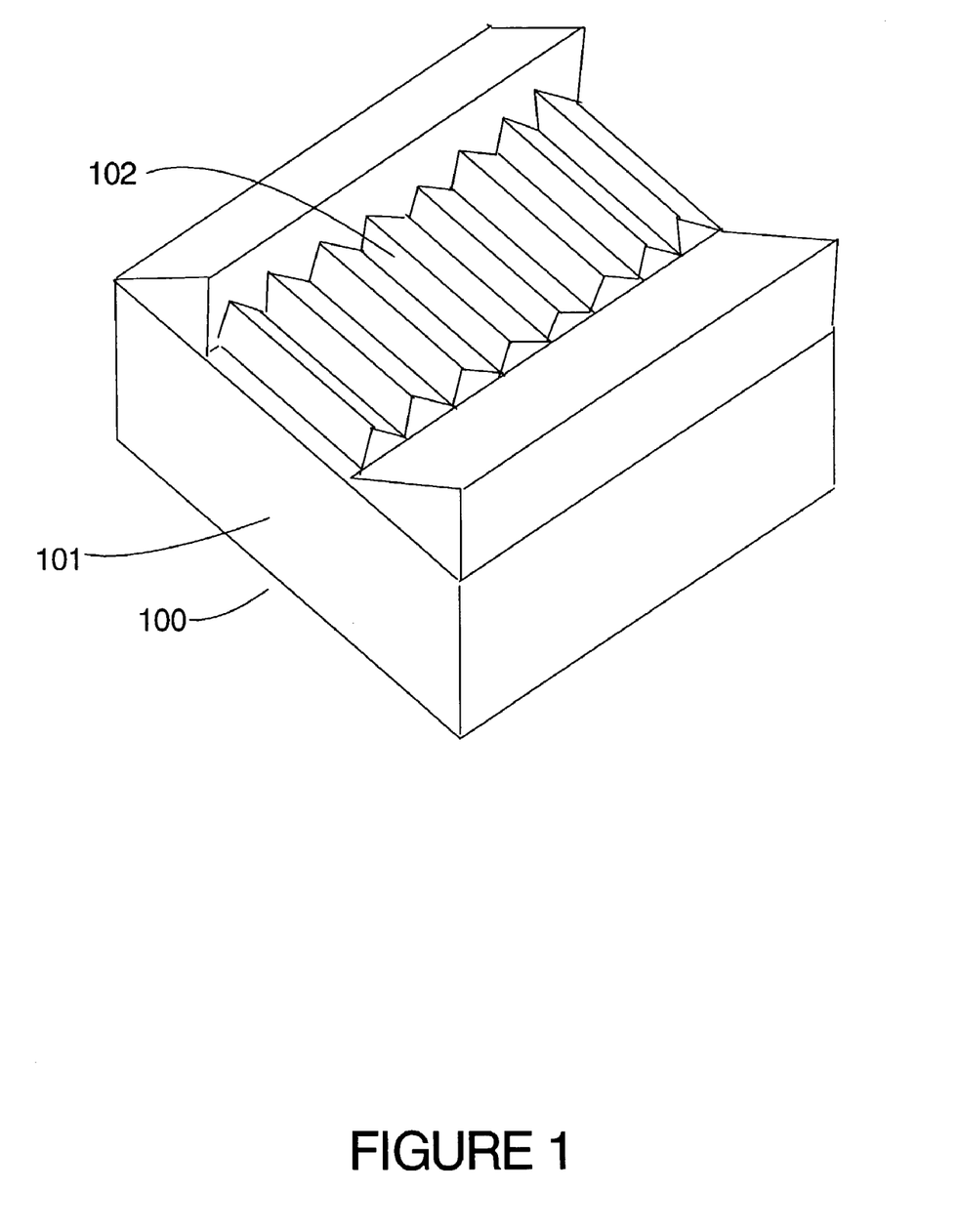
FIG. 1 is a perspective view of a first traction control device of this invention.

FIG. 1 shows a perspective view of a first traction control device 100 of this invention. This device 100 has a cut contact surface 102 mounted on a base 101. The base 101 is metal, typically steel, carbide or other similarly hard metal. Generally, the base 101 is provided with pockets or other locations where the contact surfaces 102 (inserts) can be fixed. Typically, the fixation of the contact surface 102 is accomplished by brazing, shrink fit, press fit, threading and/or adhesive or the like. The contact surface 102 is typically composed of diamond, generally polycrystalline diamond, although in alternative embodiments the contact surface 102 may be composed of carbide, thermally stable diamond, cubic boron nitride, wurzite, combinations thereof and other like superhard materials. The contact surface 102 is presently cut using a wire Electrical Discharge Machining (EDM) process to cut the insert from a Polycrystalline Diamond Compact (PDC) blank or carbide mass. Alternative cutting techniques, although not presently preferred, such as plunge EDM, electrical discharge grinding (EDG), grinding, laser cutting and the like can be substituted without departing from the concept of this invention. Alternatively, the contact surface could be formed integral to the PDC blank by use of molds during the manufacturing process similar to methods described in U.S. Pat. No. 4,629,373 of which is hereby incorporated by reference.

Figure 2:
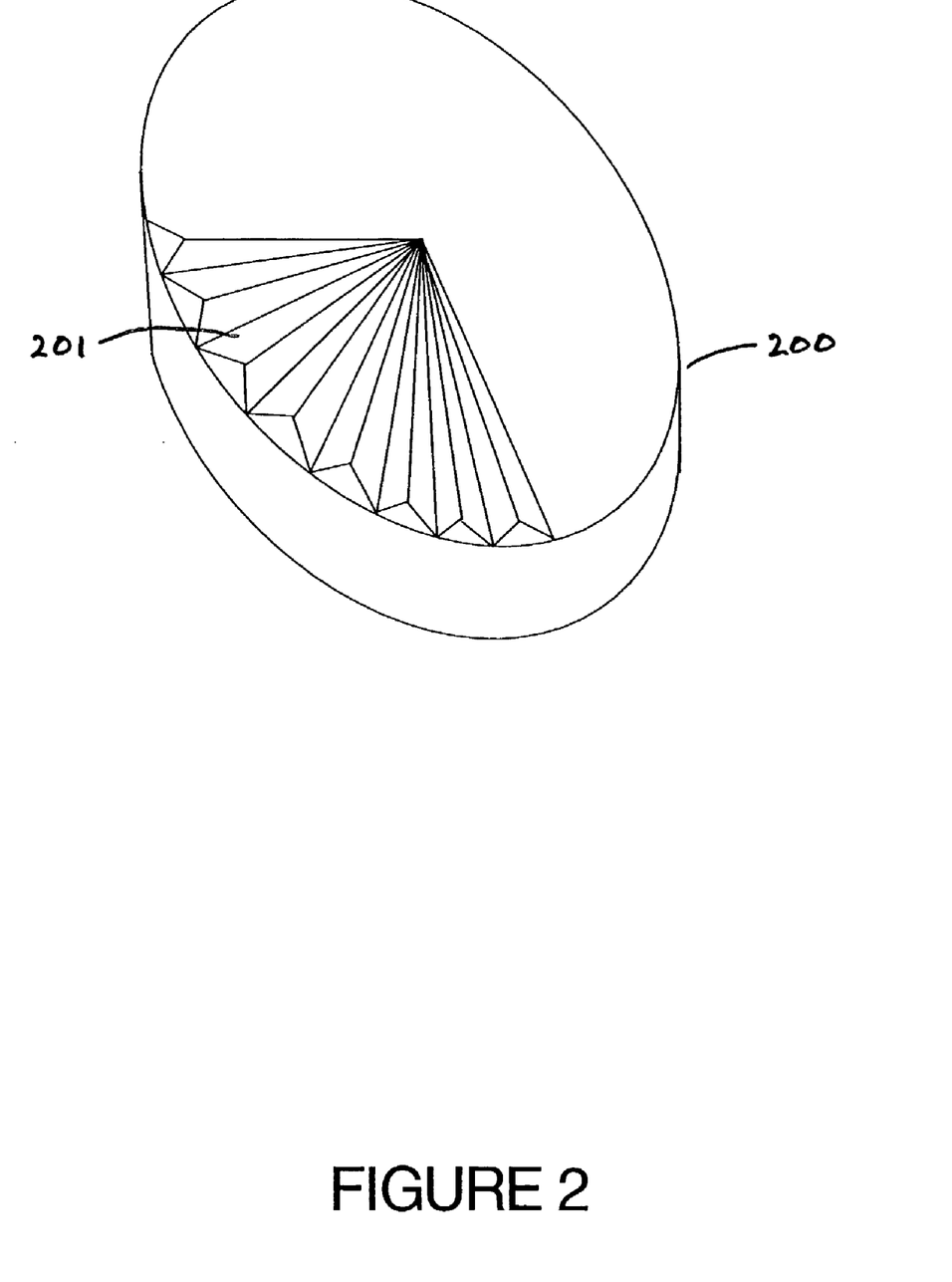
FIG. 2 is a perspective view of an exemplary traction control device of this invention during the cutting operation.

FIG. 2 shows a perspective view of an exemplary traction control device 200 of this invention during the cutting operation. The contact surface of the control device 200 is cut using a rotation cutting process, where after each, typically wire EDM, cut 201 is made the part 200 is rotated exposing a new section of the device for cutting. The amount of rotation can be from a very small angle, less than one degree to a large angle such as 90 to 180 degrees. The cuts may produce profiles of varying cut depth and angle, as shown in subsequent figures, in order to optimize the angles of the facets of the contact surface for the material type being anchored to or gripped. Typically, although not necessarily, the cuts are designed to produce points that are normal, or at optimized angles, to the surface being anchored or gripped.

Figure 3A:
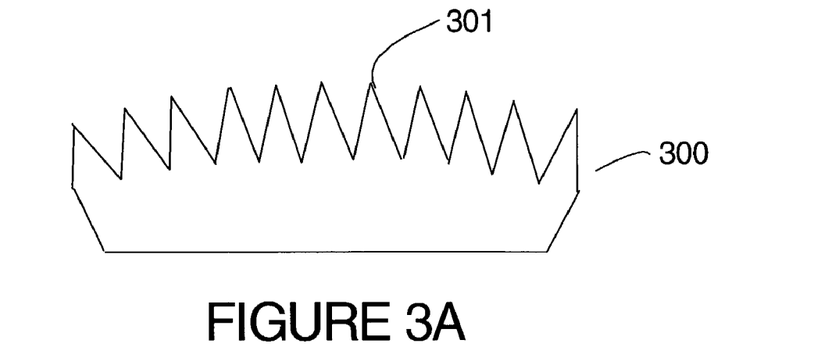
FIG. 3a is a side section view of the exemplary traction control device of this invention.

FIG. 3a shows a side section view of an exemplary traction control device 300 of this invention. This device 300 has angles that match the wall of the hole (as in a down-hole application) producing contact surface points 301 defining a segment of a circle. In this manner this device 300 provides contact surface points 301 where the specific angle of each contact surface point 301 is optimized to cause an even amount of force on each contact surface point 301 with a given penetration.

Figure 3B:
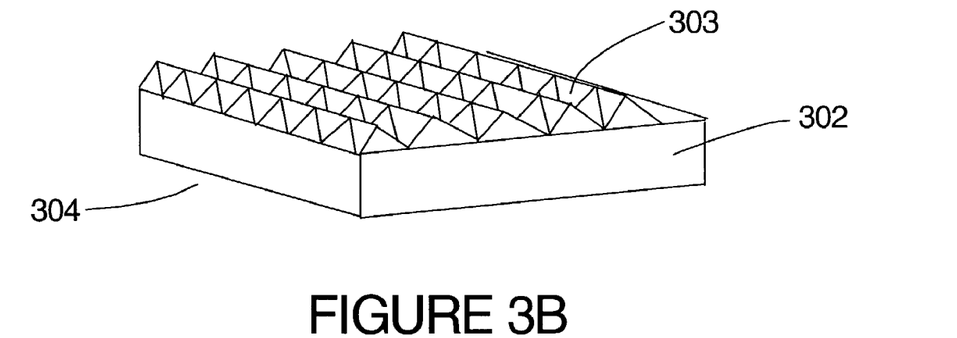
FIG. 3b is a perspective view of the exemplary traction control device showing the cut traction surfaces.

FIG. 3b shows a perspective view of the exemplary traction control device 304 showing the cut traction surfaces 303. The base 302 has a series of cut contact surfaces 303 on its top surface. In this embodiment, the contact surfaces 303 are cut in multiple directions as shown.

Figure 4:
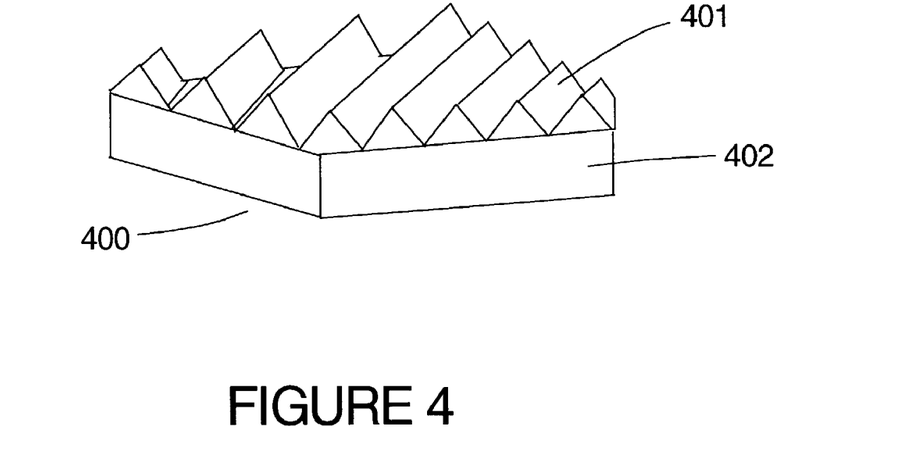
FIG. 4 is a perspective view of a second cutting step of the manufacture of the exemplary traction control device of this invention.

FIG. 4 shows a perspective view of a second cutting step of the manufacture of the exemplary traction control device 400 of this invention. This device has a different cut made at a 90 degree angle to a first cut to thereby produce contact surfaces 401 having a generally diagonal pyramid shape.

Figures 5A, 5B:
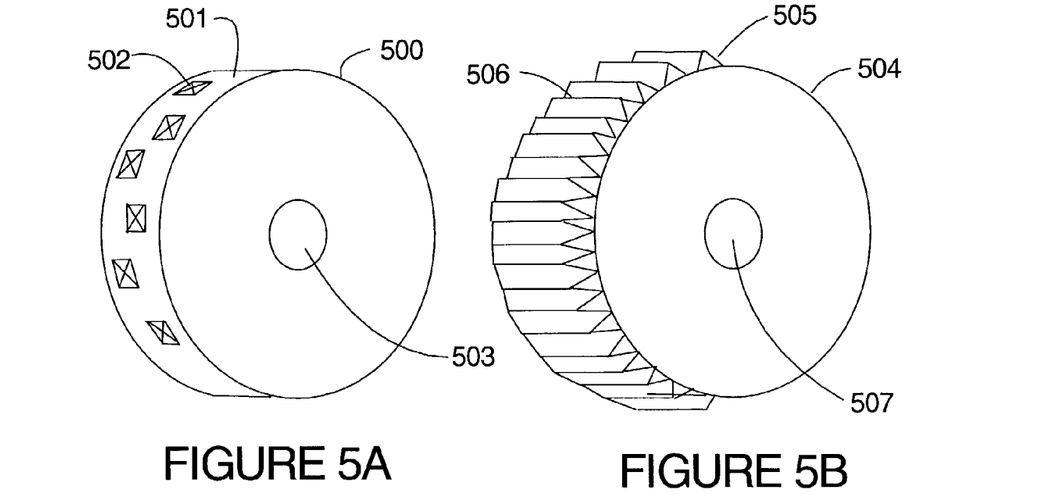
FIGS. 5a, 5b and 5c are perspective views of a various exemplary embodiments of the traction control device of this invention as part of completed assemblies.
Figure 5C:
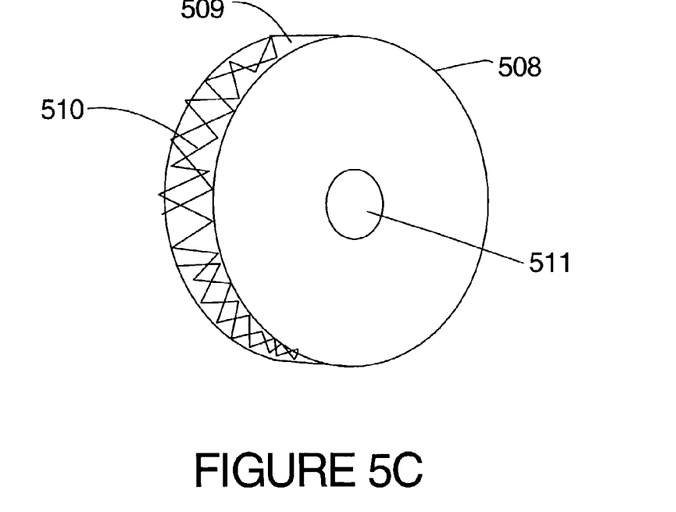

FIGS. 5a, 5b and 5c shows perspective views of a various exemplary embodiments of the traction control device of this invention as part of completed assemblies. FIG. 5a shows a number of pyramid shaped contact surfaces 502 fixed to the side 501 of a cylinder base 500, which is provided with a center opening 503. FIG. 5b shows a number of wedge shaped contact surfaces 506 fixed to the side 505 of a cylinder base 504, also having a center opening 507. FIG. 5c shows a number of diamond pyramid shaped contact surfaces 510 on the side 509 of a cylinder base 508, having a center opening 511.

Figure 6A:
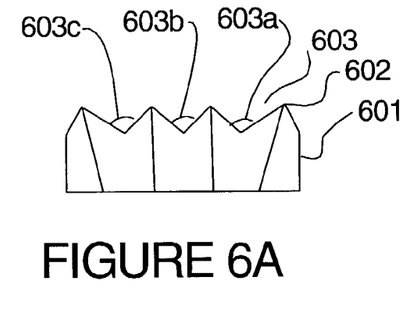
FIGS. 6a-6r are side section and perspective view of geometric details of various exemplary embodiments of the traction control surfaces of this invention.
Figure 6B:
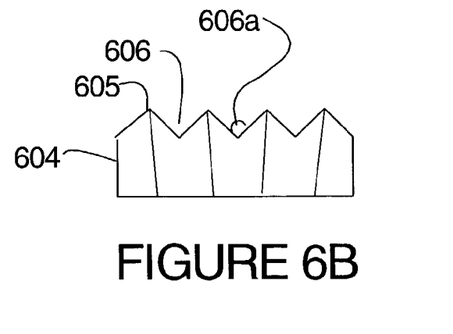
Figure 6C:
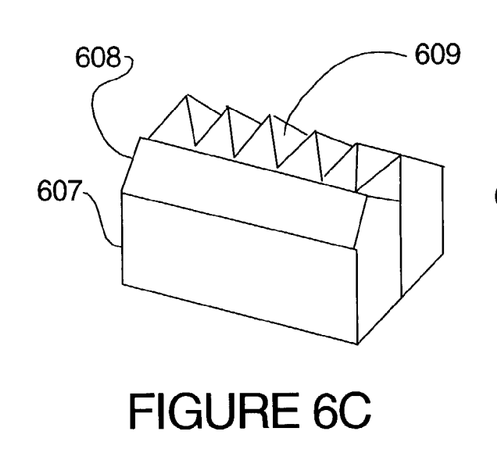
Figure 6D:
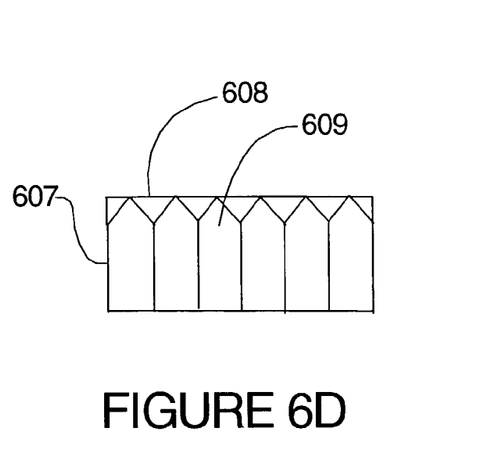
Figure 6E:
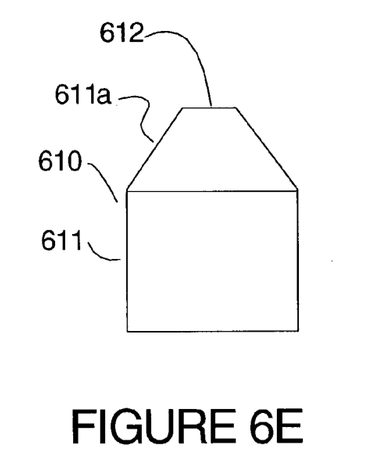
Figure 6F:
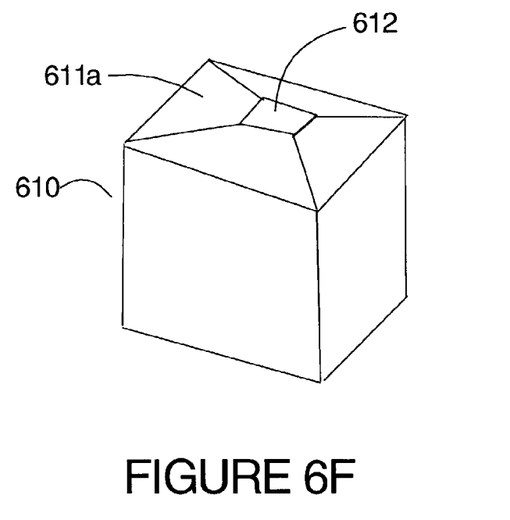
Figures 6G, 6H:
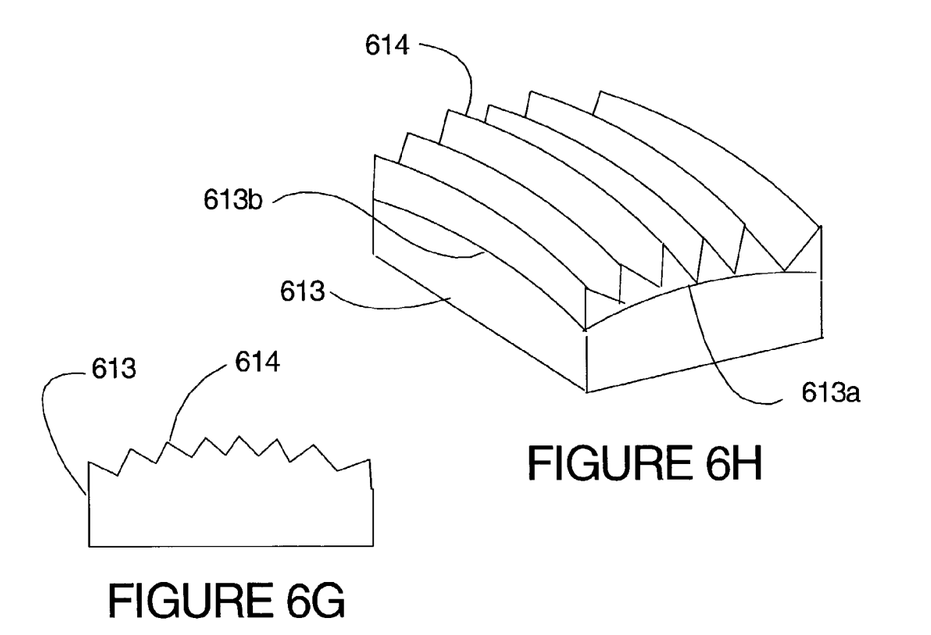
Figures 6I, 6J:
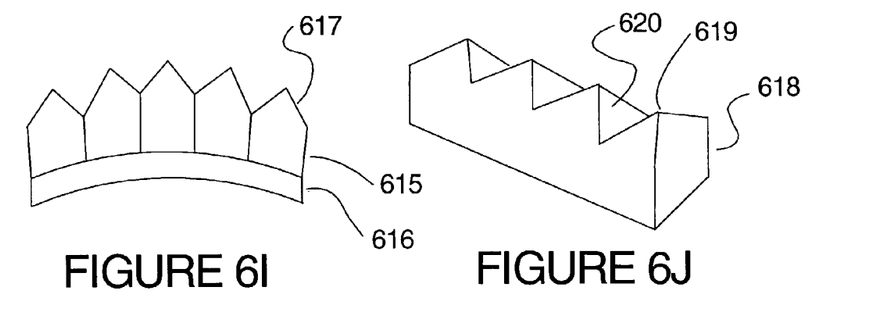
Figure 6K:
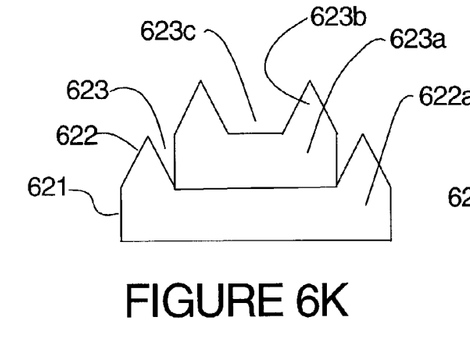
Figure 6L:
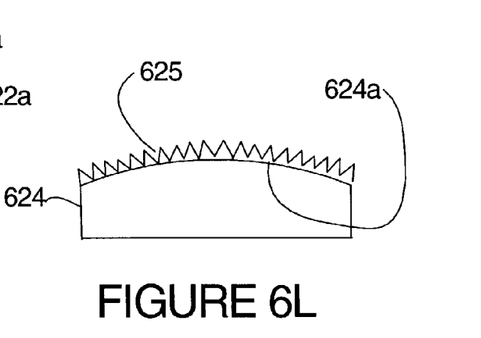
Figure 6M:
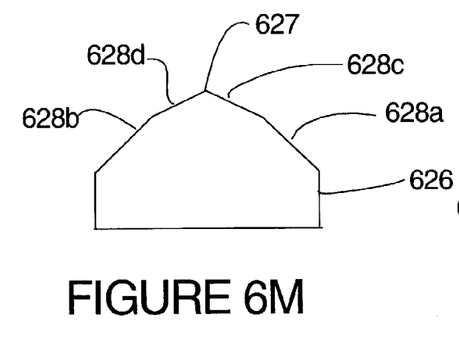
Figure 6N:
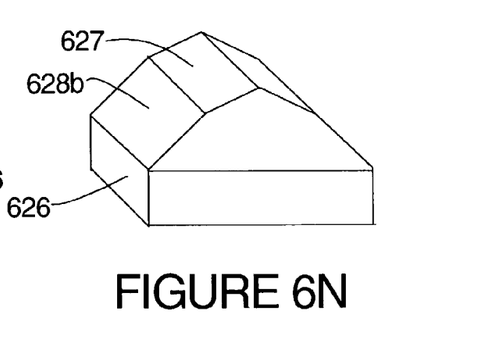
Figure 6O:
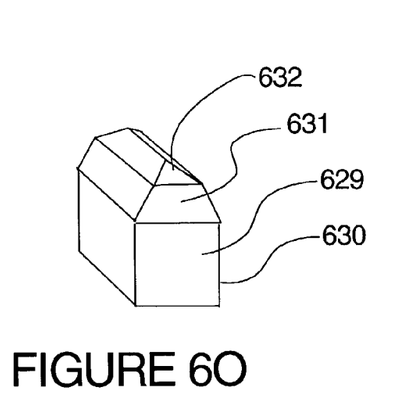
Figure 6P:
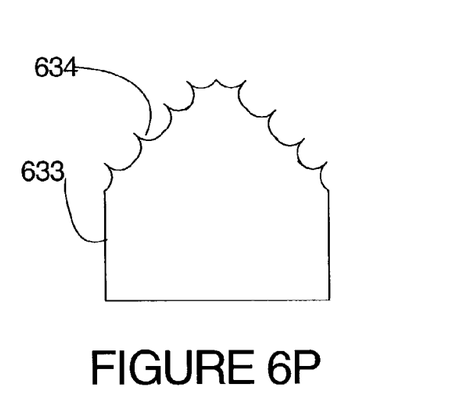
Figure 6Q:
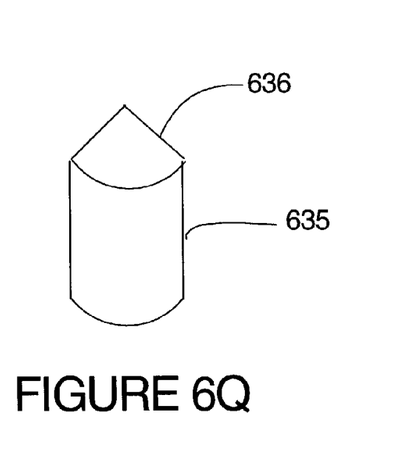
Figure 6R:
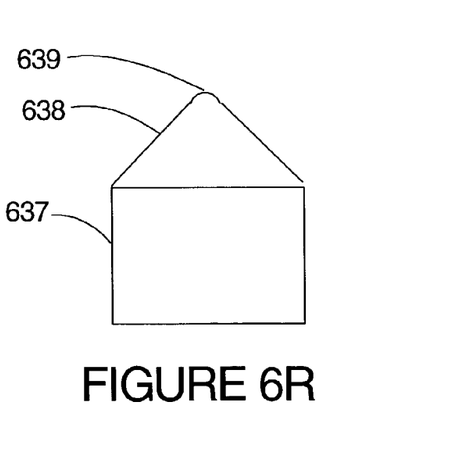

FIGS. 6a-6r shows side section and perspective view of geometric details of various exemplary embodiments of the traction control surfaces of this invention, for the purpose of showing some of the wide variety of contact surfaces that can be employed in as the diamond/carbide gripping surface in various embodiments of this invention. FIG. 6a shows a contact surface 601 having a number of contact points 602 separated by recesses 603 having various different angles 603a, 603b, 603c. FIG. 6b shows a contact surface 604 with contact surfaces 605 separated by recesses 606 which have essentially the same angle 606a. FIG. 6c shows a contact surface 607 with a combination of ridges 608 and peaks 609. FIG. 6d shows a side section view of the contact surface 607 with a combination of ridges 608 and peaks 609. FIG. 6e shows a contact surface 610 that has a rectangular solid portion 611, a pyramidal portion 611a and a top first contact surface 612. This particular embodiment 610 of the contact surface has a flat top first contact surface 612. In alternative embodiments, it is envisioned that the flat top first contact surface 612 can be replaced with a serrated or other three dimensional top first contact surface, without departing from the concept of this invention. FIG. 6g shows a side section view of a radiused contact surface ridge 613 having multiple first contact points 614. FIG. 6h shows a three-dimensional view of the contact surface 613 showing that the contact surface 613 is radiused in a first 613a and a second 613b direction. FIG. 6i shows a side section view of a contact surface 615 made of a number of separate contact elements 617 mounted to a base or substrate 616. FIG. 6j shows a similar contact surface 618, where the initial contact surfaces 619 are defined by cuts 620 from a single piece. FIG. 6k is a nested contact surface 621 having a first section 622a with contact points 622 and a second section 623a with contact points 623b separated by a top surface gap 623c. The first 622a and second 623b sections are separated by gaps 623. In this embodiment 621 the two sections 622a, 623b are made as two separate parts and then joined by fixing them together. FIG. 6l shows a side section view of a contact surface 624 that has a generally curved top 624a and a serrated first contact surface 625 on the generally curved top 624a. FIG. 6m shows a side section view of a contact surface 626 that has multiple facets 628a-d and providing a first contact point 627. FIG. 6n shows a perspective view of the multiple faceted contact surface 626. FIG. 6o shows a perspective view of an alternative multiple faceted 629, 631, 632 contact surface 630 having a pyramidal top first contact surface 632. FIG. 6p shows a side section view of a contact surface 633 with a serrated first contact surface 634. FIG. 6q shows a cylindrical contact surface 635 with a conical top first contact surface 636. FIG. 6r shows a side section view of an alternative cylindrical contact surface 637 with a conical top first contact surface 638 with a rounded tip 639.

Figure 7:
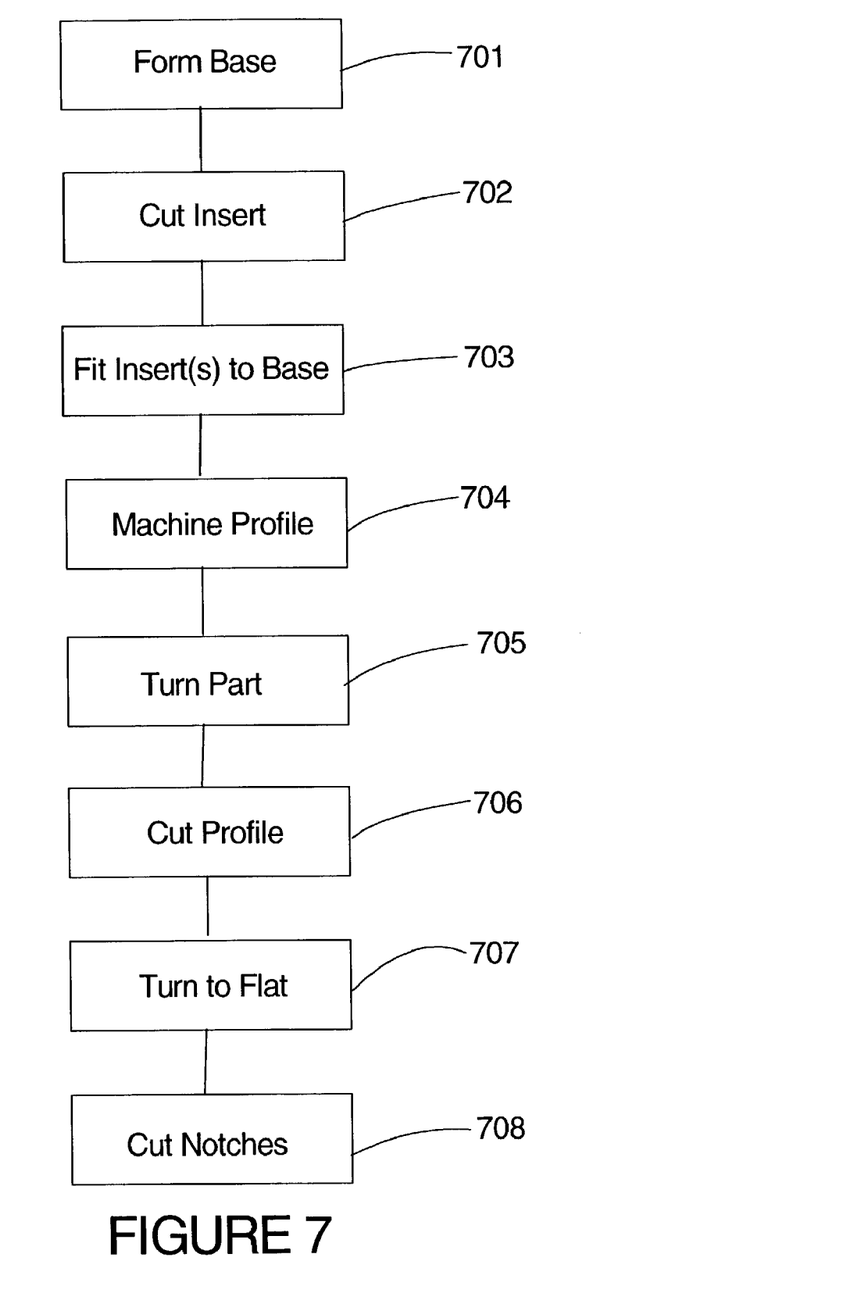
FIG. 7 is a process flow chart of the present preferred manufacturing steps of the manufacture of the traction control devices of this invention. Reference will now be made in detail to the present preferred embodiment of the invention, examples of which are illustrated in the accompanying drawings.

FIG. 7 shows a process flow chart of the present preferred manufacturing steps of the manufacture of the traction control devices of this invention. A base is formed 701, typically out of a hard metal such as steel, carbide or the like, generally with pockets or other similar locations for receiving contact surface inserts. The insert is cut 702 to provide the desired contact surface shape. Typically and presently preferably this cut 702 is made using a wire EDM process. Also, the present insert is composed of diamond, carbide or the combination of diamond and carbide formed as a PDC type insert, with a tungsten-carbide substrate and a polycrystalline diamond top contact surface. In alternative embodiments, the contact surface can be made from diamond or carbide alone. Alternatively materials such as cubic boron nitride, thermally stable diamond, wurzite and other superhard materials may also form a contact surface. The insert(s) are fit 703 into the base. The present embodiment fits 703 the inserts forming the contact surface into the base using such methods as brazing, shrink fitting, press fitting, adhesively gluing, clamping, screwing, bolting, pining or other standard mechanical fitting methods. A profile is machined 704 into the base and/or contact surface appropriate to the material and shape being gripped. In many embodiments, multiple profiles can be cut into the base and/or contact surface as appropriate. The part is typically turned 705 to reposition the part for cutting of an additional profile. This turning 705 of the part, is typically at or about ninety degrees, although alternative turning angles from very small, less than one degree, to large in excess of 180 degrees, can be substituted. The additional profile is cut 706. The profile cut generally creates points for initial contact and provides the arrangement of the initial contact points. In alternative embodiments, the profile provides one or more facets that may be either angularly consistent or may vary as they are optimized for the material being anchored to or gripped. The facets in some embodiments have serrated edges. Often sharp initial contact points have multiple angles on the same part. In other alternatives, ridges are provides as contact points, either alone or in combination with traction points. Traction, or initial contact points, may have first contact surfaces, or tips, that are flat, blunted, serrated, irregular, rounded or sharp. The traction part is turned 707 to a flat portion and notches are generally cut into the side of the traction part.

The described embodiments are to be considered in all respects only as illustrative of the current best modes of the invention known to the inventors at the time of filing this application, and not as restrictive. Although the several embodiments shown here include specific geometries and steps, these are provided in order to show examples of the present embodiments of this invention. Rather, the geometries are provided to show several examples. This scope of this invention is, therefore, indicated by the appended claims rather than by the foregoing description. All devices and processes that come within the meaning and range of equivalency of the claims are to be embraced as within the scope of this patent.

The invention claimed is:

1. A traction control device for gripping surfaces, the traction control device comprising:
   a base;
   a contact insert fixed to the base, wherein the contact insert comprises a contact surface, the contact surface comprising a polycrystalline diamond region:
   wherein the polycrystalline diamond region is bonded to a nonferrous substrate.

2. The traction control device, as recited in claim 1, wherein the base comprises a hard metal.

3. The traction control device, as recited in claim 1, wherein the base comprises a steel material.

4. The traction control device, as recited in claim 1, wherein the contact insert comprises a polycrystalline diamond region, bonded to a tungsten carbide region.

5. The traction control device, as recited in claim 1, wherein the contact surface has a surface shape selected from the group consisting of: rounded surfaces, pointed surfaces, ridges, grooves, flat surfaces and serrated surfaces.

6. The traction control device, as recited in claim 1, wherein the contact surface comprises a textured surface.

7. A traction control device, comprising:
   a base;
   a contact insert fixed to the base, wherein the contact insert comprises a contact surface, the contact surface comprising polycrystalline diamond;
   wherein the contact surface is structured to grip the sides of a hole.

8. The traction control device, as recited in claim 7, wherein the base comprises a hard metal.

9. The traction control device, as recited in claim 7, wherein the base comprises a steel material.

10. The traction control device, as recited in claim 7, wherein the contact insert comprises a polycrystalline diamond region bonded to a tungsten carbide region.

11. The traction control device, as recited in claim 7, wherein the contact surface has a surface shape selected from the group consisting of: rounded surfaces, pointed surfaces, ridges, grooves, flat surfaces and serrated surfaces.

12. The traction control device, as recited in claim 7, wherein the contact surface comprises a textured surface.

13. A traction control device, comprising:
   a base;
   a contact insert fixed to the base, wherein the contact insert comprises a contact surface, the contact surface comprising polycrystalline diamond;
   wherein the contact surface forms gripping jaws for lifting pipe.

14. The traction control device, as recited in claim 13, wherein the base comprises a hard metal.

15. The traction control device, as recited in claim 13, wherein the base comprises a steel material.

16. The traction control device, as recited in claim 13, wherein the contact insert comprises a polycrystalline diamond region bonded to a tungsten carbide region.

17. The traction control device, as recited in claim 13, wherein the contact surface has a surface shape selected from the group consisting of: rounded surfaces, pointed surfaces, ridges, grooves, flat surfaces and serrated surfaces.

18. The traction control device, as recited in claim 13, wherein the contact surface comprises a textured surface.

\* \* \* \* \*